(12) United States Patent
Sticht et al.

(10) Patent No.: US 8,107,494 B2
(45) Date of Patent: *Jan. 31, 2012

(54) METHOD AND APPARATUS FOR GENERATING VIRTUAL CLOCK SIGNALS

(75) Inventors: Konrad Sticht, Eschenbach (DE); Andreas Zottmann, Erlangen (DE)

(73) Assignee: Alcatel Lucent, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/512,488

(22) Filed: Jul. 30, 2009

(65) Prior Publication Data

US 2009/0290596 A1 Nov. 26, 2009

Related U.S. Application Data

(63) Continuation of application No. 11/192,485, filed on Jul. 28, 2005, now Pat. No. 7,593,430.

(51) Int. Cl.
*H04J 3/16* (2006.01)
(52) U.S. Cl. .......................... 370/466; 370/503; 370/372
(58) Field of Classification Search .................. 370/503, 370/535, 395, 466; 375/372
See application file for complete search history.

(56) References Cited

U.S. PATENT DOCUMENTS

| 5,067,126 | A | * | 11/1991 | Moore | 370/544 |
| 6,675,272 | B2 | | 1/2004 | Ware et al. | |
| 7,333,151 | B2 | * | 2/2008 | Ozawa | 348/537 |
| 2002/0044620 | A1 | | 4/2002 | Spijker et al. | |
| 2003/0123587 | A1 | | 7/2003 | Blaum et al. | |
| 2004/0213253 | A1 | * | 10/2004 | Evans | 370/395.1 |
| 2005/0090215 | A1 | | 4/2005 | Cheng et al. | |
| 2005/0220240 | A1 | * | 10/2005 | Lesso | 375/372 |
| 2006/0143345 | A1 | | 6/2006 | Fredriksson | |

* cited by examiner

*Primary Examiner* — Ricky Ngo
*Assistant Examiner* — David Oveissi
(74) *Attorney, Agent, or Firm* — Wall & Tong, LLP (57) ABSTRACT

The invention includes a method and apparatus for generating virtual clock signals for differing hierarchies in a communication system conveying data frames of differing hierarchies. Specifically, a method according to one embodiment of the invention includes receiving data frames of a first hierarchy, receiving at least one input clock signal, and generating a virtual clock signal using the at least one input clock signal and a clock enable signal. The clock enable signal is generated using at least one of a data rate ratio and a clock rate ratio. The virtual clock signal is adapted for converting at least a portion of the data frames of the first hierarchy to data frames of a second hierarchy. The frequency of the virtual clock signal is determined by applying the clock enable signal to a common clock signal.

25 Claims, 6 Drawing Sheets

METHOD AND APPARATUS FOR GENERATING VIRTUAL CLOCK SIGNALS

CROSS-REFERENCE TO RELATED APPLICATION

This application is a continuation of U.S. patent application Ser. No. 11/192,485, filed Jul. 28, 2005, entitled METHOD AND APPARATUS FOR GENERATING VIRTUAL CLOCK SIGNALS, now U.S. Pat. No. 7,593,430, which application is incorporated herein by reference.

FIELD OF THE INVENTION

The invention relates to the field of communication networks and, more specifically, to generating clock signals for adapting data frames.

BACKGROUND OF THE INVENTION

A number of standards for asynchronous data transmission (e.g., International Telecommunication Union—Telecommunication Standardization Sector (ITU-T) G.705, G.707, G.709, and the like) define data frame mapping schemes for multiple hierarchies. The ITU-T G.705 standard defines various Plesiochronous Digital Hierarchy (PDH) applications utilizing different data rates for each hierarchy. The G.707 (G.modem) standard describes transport of optical data unit (ODU) signals using virtually concatenation. The G.709 standard defines time division multiplexing (TDM) and constant bit rate (CBR) multiplexing using various hierarchies of an optical transport network (OTN). Furthermore, the jitter generation requirements for equipment associated with such networks are defined in associated ITU-T standards (e.g., ITU-T G.824, G.825, G.825.1, and similar standards).

As opposed to networks using synchronous systems (e.g., Synchronous Digital Hierarchy (SDH), where the frequency of Synchronous Transfer Mode (STM) Level 4 (STM4) is four times the frequency of STM1), the data rates of asynchronous transmission systems are not integer multiples. For example, the data rate of ODU2 is approximately equal to (238/237)*4 times the data rate of ODU1. Since PDH, OTN, and like signals do not support pointer mechanisms, stuffing (e.g., a bit for PDH, a byte for OTN, and the like) is needed in order to map multiple client signals with different frequency drift in a single bit stream. For demapping of the client signals, a desynchronizer is necessary to meet the jitter requirements.

The existing method of demapping requires an external analog phase-locked loop for each data channel and each hierarchical level. As such, a large number of external analog phase-locked loops is often required for demapping client signals. This large number of analog phase-locked loops is expensive in terms of space (e.g., large printed circuit boards are required for demapping), component reliability, system reliability, power consumption, crosstalk, device cost, and associated parameters. Furthermore, a single step desynchronizer approach is not possible due to the data frames of the differing hierarchies drifting against each other. Thus, a single step implementation would actually result in additional low frequency jitter and wander.

SUMMARY OF THE INVENTION

Various deficiencies in the prior art are addressed through the invention of a method and apparatus for generating virtual clock signals for differing hierarchies in a communication system conveying data frames of differing hierarchies. Specifically, a method according to one embodiment of the invention includes receiving data frames of a first hierarchy, receiving at least one input clock signal, and generating a virtual clock signal using the at least one input clock signal and a clock enable signal. The clock enable signal is generated using at least one of a data rate ratio and a clock rate ratio. The virtual clock signal is adapted for converting at least a portion of the data frames of the first hierarchy to data frames of a second hierarchy. The frequency of the virtual clock signal is determined by applying the clock enable signal to a common clock signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention is discussed in the context of a communications network architecture including a plurality of optical network elements conveying data frames of differing Optical Transport Network (OTN) signal hierarchies; however, the present invention can readily be applied to other networks and associated signaling hierarchies. In general, the present invention enables generation of clock enable signals adapted for use in generating virtual clock signals from a common clock signal. In a communication system conveying data frames of differing hierarchies, the virtual clock signals enable adaptation of data frames of one hierarchy to data frames of another hierarchy. In other words, the present invention is operable for internally generating (e.g., without using associated external analog phase-locked loops) various required clock signal frequencies from a common clock signal frequency.

The present invention generates clock enable signals using at least one of common clock signals, relative buffer fill levels, clock rate ratios, data rate ratios, and the like, as well as various combinations thereof. The clock enable signals are applied to the common clock signals (e.g., a common read clock signal, a common write clock signal, and the like) to produce virtual clock signals of differing frequencies. In one embodiment, a common clock comprises a normal real clock used to clock registers. In one embodiment, the clock enable signal defines the frequency at which the normal real clock is used for clocking registers by enabling the register input not at all clock edges, but, rather, only for a defined ratio of clock edges.

As such, by generating internal virtual clock signals using a common clock signal and generated clock enable signals, the present invention thereby obviates the need for use of external analog phase-locked loops for adapting data frames of asynchronous signaling hierarchies. In other words, the present invention enables adaptation of data frames of one hierarchy to data frames of another hierarchy using systems having significantly less components. Thus, since the present invention eliminates the need for use of external analog phase-locked loops for controlling adaptation of data frames between differing hierarchies, the present invention results in improved system reliability, significantly lower system costs, and like benefits.

Figure 1:
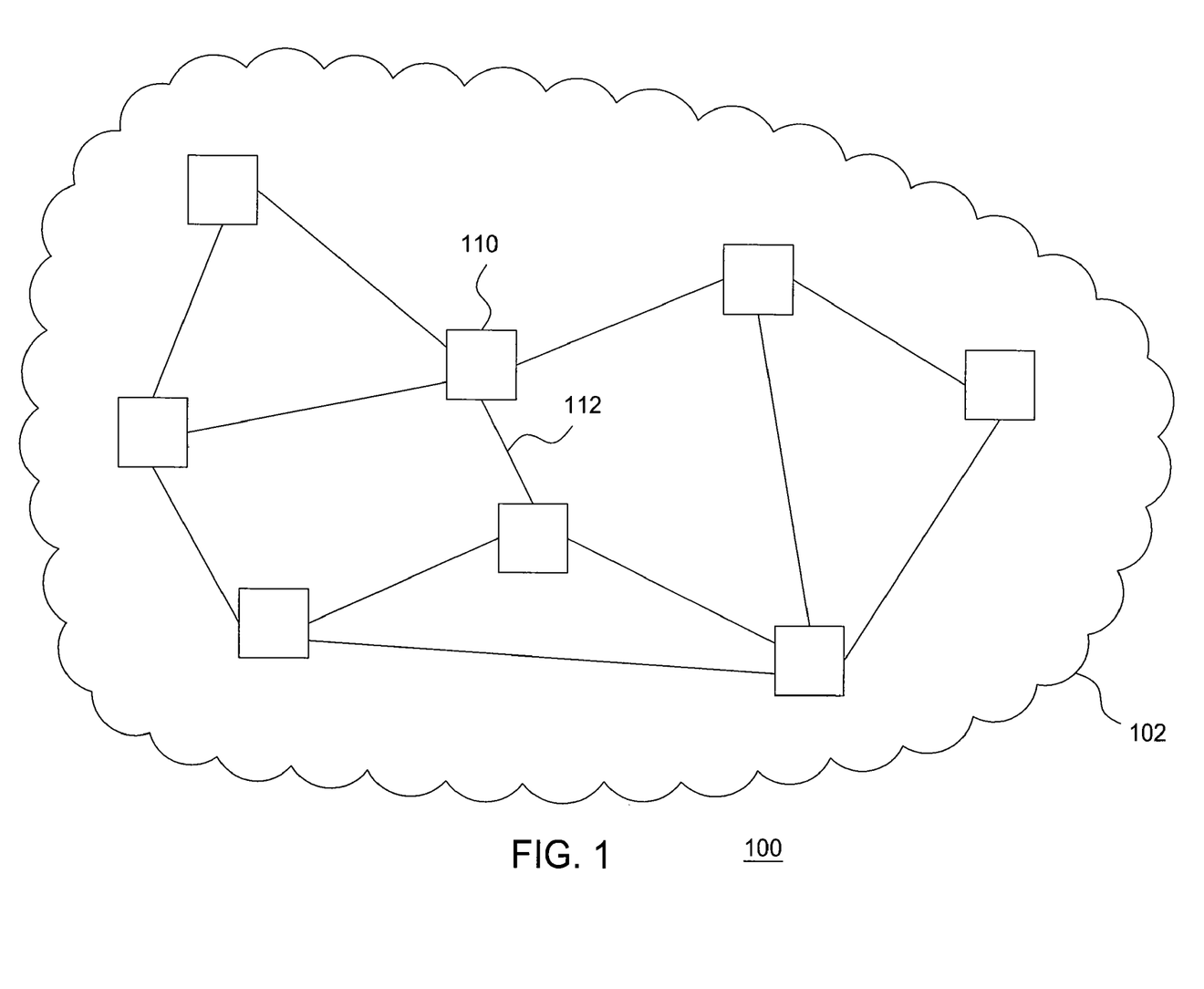
FIG. 1 depicts a high-level block diagram of a communications network architecture.

FIG. 1 depicts a high-level block diagram of a communications network architecture. Specifically, communications network architecture 100 of FIG. 1 comprises a network 102 including a plurality of network elements (NEs) 110 (collectively, NEs 110) in communication using a plurality of communication links (CLs) 112 (collectively, CLs 112). Since the present invention may be used for generating virtual clock signals for various signal hierarchies, network 102 may comprise a network operable for transporting asynchronous client signals. For example, network 102 may comprise at least one of an optical transport network (OTN), a plesiochronous digital hierarchy (PDH) network, and like networks, as well as various combinations thereof.

As primarily described herein, network 102 comprises an OTN and NEs 110 comprise optical network elements adapted for supporting the ITU-T G.709 OTN signaling hierarchy. As defined in ITU-T G.709, OTN signaling enables transparent transport of various client signals (e.g., Synchronous Optical Network (SONET) signals, Synchronous Digital Hierarchy (SDH) signals, Asynchronous Transfer Mode (ATM) signals, Internet Protocol (IP) signals, and like signals) using OTN signals according to the OTN signaling hierarchy (e.g., Optical Channel Payload Unit (OPUk) signals, Optical Channel Data Unit (ODUk) signals, Optical Channel Transport Unit (OTUk) signals, Optical Channel (OCh) signals, and like signals).

As defined in ITU-T G.709, OPUk, ODUk, and OTUk signals operate in the electrical domain, and OCh signals operate in the optical domain. The OPU1/ODU1/OTU1 bit rate is approximately 2.5 Gbps, the OPU2/ODU2/OTU2 bit rate is approximately 10 Gbps, and the OPU3/ODU3/OTU3 bit rate is approximately 40 Gbps. In one embodiment, ONEs 110 perform signal mapping (and associated signal synchronization) functions and signal demapping (and associated signal desynchronization) functions in accordance with the G.709 standard and various associated standards. In one further embodiment, ONEs 110 perform at least a portion of the functions of the present invention for adapting data frames of one hierarchy to data frames of another hierarchy.

In general, signal synchronization is performed in order to prepare OTN signals for transmission. An OPU1 signal including a client signal is mapped into an ODU1 signal. An ODU1 signal is mapped into at least one of an OTU1 signal, an OPU2 signal, and OPU3 signal, and various combinations thereof. An OPU2 signal, including at least one of ODU1 signals and client signals, as well as various combinations thereof, is mapped into an ODU2 signal. An ODU2 signal is mapped into at least one of an OTU2 signal and an OPU3 signal, and various combinations thereof. An OPU3 signal, including at least one of ODU1 signals, ODU2 signals, and client signals, as well as various combinations thereof, is mapped into an ODU3 signal. An ODU3 signal is mapped into an OTU3 signal.

In general, signal desynchronization is performed in order to prepare OTN signals for further processing within a network element. In one embodiment, an optical network element (illustratively, ONEs 110) performs at least a portion of the methodologies of the present invention. In one such embodiment, the optical network element comprises at least one desynchronizer operable for adapting data frames of one hierarchy to data frames of another hierarchy using virtual clock signals. In one embodiment, the data frames of differing hierarchies include data frames associated with Optical Transport Network (OTN) signals (e.g., ODU1, ODU2, ODU3, and the like). For example, in one such embodiment, adaptation of data frames of one hierarchy to data frames of differing hierarchies may include adapting ODU3 data frames to ODU2 data frames, adapting ODU2 data frames to ODU1 data frames, and the like.

Furthermore, although described herein with respect to generation of virtual clock signals for OTN signals, the present invention may be used for generating virtual clock signals for adapting various other asynchronous signals. An apparatus for adapting data frames of one OTN signaling hierarchy to data frames of another OTN signaling hierarchy is depicted and described with respect to FIG. 2.

Figure 2:
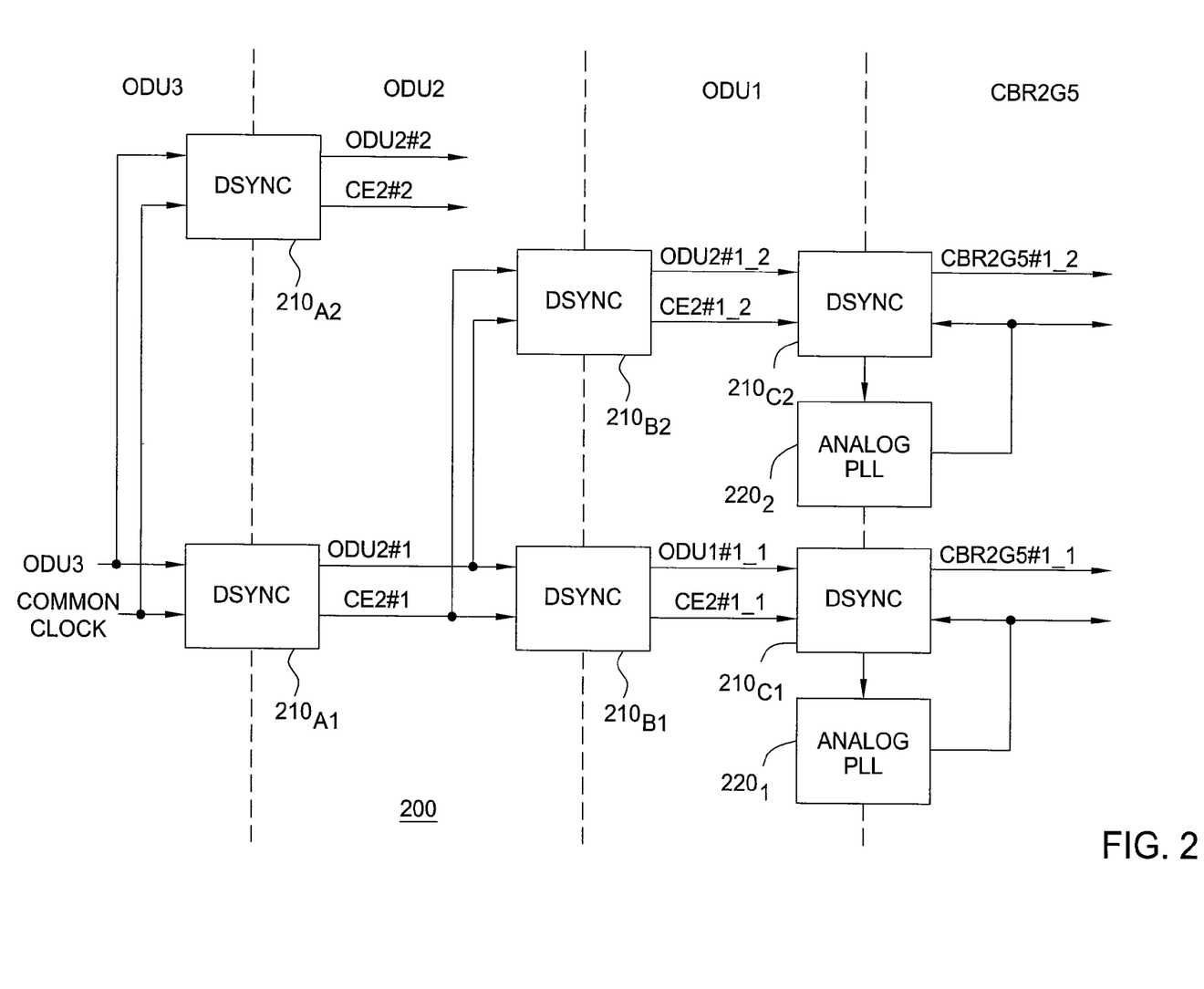
FIG. 2 depicts a high-level block diagram of a portion of one of the network elements depicted in FIG. 1.

FIG. 2 depicts a high-level block diagram of a portion of one of the network elements depicted in FIG. 1. Specifically, the portion of the network element 110 of FIG. 2 comprises a first desynchronizer stage including desynchronizer (DSYNC) $210_{A1}$ and desynchronizer (DSYNC) $210_{A2}$, a second desynchronizer stage including desynchronizer (DSYNC) $210_{B1}$ and desynchronizer (DSYNC) $210_{B2}$, and a third desynchronizer stage including desynchronizer (DSYNC) $210_{B2}$, and desynchronizer (DSYNC) $210_{C2}$. The first stage DSYNCs $210_{A1}$ and $210_{A2}$ are collectively denoted as DSYNCs $210_A$, the second stage DSYNCs $210_{B1}$ and $210_{B2}$ are collectively denoted as DSYNCs $210_B$, and the third stage DSYNCs $210_{C1}$ and $210_{C2}$ are collectively denoted as DSYNCs $210_C$. Furthermore, the DSYNCs $210_{A1}$, $210_{A2}$, $210_{B1}$, $210_{B2}$, $210_{C1}$, and $210_{C2}$ are collectively denoted as DSYNCs 210.

As depicted in FIG. 2, the first desynchronizer stage comprises a first desynchronizer stage, the second desynchronizer stage comprises an intermediate desynchronizer stage, and the third desynchronizer stage comprises a final desynchronizer stage. Although primarily described herein with respect to three desynchronizer stages, the present invention may be implemented using any number of desynchronizer stages. Furthermore, although primarily described herein with respect to a single intermediate desynchronizer stage, the present invention may be implemented using any number of intermediate desynchronizer stages. In various embodiments of the present invention, the number of desynchronizer stages and the number of intermediate desynchronizer stages depend on factors such as the number of different data frame hierarchy conversion, the number of different data rate conversions, and like factors, as well as various combinations thereof.

As depicted in FIG. 2, ODU3 data frames are adapted to produce CBR2G5 data frames. In particular, the first desynchronizer stage adapts ODU3 data frames to produce ODU2 data frames, the second desynchronizer stage adapts ODU2 data frames to produce ODU1 data frames, and the third desynchronizer stage adapts ODU1 data frames to produce CBR2G5 data frames. The first desynchronizer stage adapts a clock signal associated with the ODU3 data frames to produce read clock enable signals operable for converting the ODU3 data frames to ODU2 data frames. The second desynchronizer stage adapts virtual clock signals associated with the ODU2 data frames to produce read clock enable signals operable for converting the ODU2 data frames to ODU1 data frames, and the third desynchronizer stage adapts the virtual clock signals associated with the ODU1 data frames to produce clock signals operable for converting the ODU1 data frames to CBR2G5 data frames.

The DSYNC $210_{A1}$ receives ODU3 data frames and an associated COMMON CLOCK signal. In one embodiment, since DSYNC $210_{A1}$ is part of the first desynchronizer stage, the COMMON CLOCK signal is removed. The DSYNC $210_{A1}$ adapts the received ODU3 data frames to produce a first portion of the ODU2 data frames (denoted as ODU2#1 output from DSYNC $210_{A1}$) transported by the ODU3 data frames. The DSYNC $210_{A1}$ adapts the ODU3 data frames to produce the ODU2 data frames using an internally generated read clock enable signal. The internally generated read clock enable signal is applied to the common clock signal to produce a virtual clock signal (denoted as CE2#1) for converting the ODU3 data frames to ODU2 data frames. The DSYNC $210_{A1}$ outputs the converted ODU2 data frames (ODU2#1) and the internally generated virtual clock signal (CE2#1) to the second desynchronizer stage (illustratively, to DSYNC $210_{B1}$ and DSYNC $210_{B2}$).

The DSYNC $210_{A2}$ receives ODU3 data frames and an associated COMMON CLOCK signal. In one embodiment, since DSYNC $210_{A2}$ is part of the first desynchronizer stage, the COMMON CLOCK signal is removed. The DSYNC $210_{A2}$ adapts the received ODU3 data frames to produce a second portion of the ODU2 data frames (denoted as ODU2#2 output from DSYNC $210_{A2}$) transported by the ODU3 data frames. The DSYNC $210_{A2}$ adapts the ODU3 data frames to produce the ODU2 data frames using an internally generated read clock enable signal. The internally generated read clock enable signal is applied to the common clock signal to produce a virtual clock signal (denoted as CE2#2) for converting the ODU3 data frames to ODU2 data frames. The DSYNC $210_{A2}$ outputs the converted ODU2 data frames (ODU2#2) and the internally generated virtual clock signal (CE2#2) to the second desynchronizer stage (to associated desynchronizers (not depicted)).

The DSYNC $210_{B1}$ receives first portion of ODU2 data frames ODU2#1 and associated virtual clock signal CE2#1 from DSYNC $210_{A1}$. The DSYNC $210_{B1}$ converts the received ODU2 data frames to ODU1 data frames (denoted as ODU1#1_1 output from DSYNC $210_{B1}$). The DSYNC $210_{B1}$ converts the ODU2#1 data frames ODU1#1_1 data frames using the virtual clock signal CE2#1 from DSYNC $210_{A1}$ as a write clock enable signal and using an internally generated read clock enable signal. The internally generated read clock enable signal is applied to the received virtual clock signal CE2#1 to generate a virtual clock signal (denoted as CE2#1_1) for converting the ODU2#1 data frames to ODU1#1_1 data frames. The DSYNC $210_{B1}$ outputs the adapted ODU1 data frames (ODU1#1_1) and the virtual clock signal CE2#1_1 to the third desynchronizer stage (illustratively, to DSYNC $210_{C1}$).

The DSYNC $210_{B2}$ receives second portion of ODU2 data frames ODU2#1 and associated virtual clock signal CE2#1 from DSYNC $210_{A1}$. The DSYNC $210_{B2}$ converts the received ODU2 data frames to ODU1 data frames (denoted as ODU1#1_2 output from DSYNC $210_{B2}$). The DSYNC $210_{B2}$ converts the ODU2#1 data frames to ODU1#1_2 data frames using the virtual clock signal CE2#1 from DSYNC $210_{A1}$ as a write clock enable signal and using an internally generated read clock enable signal. The internally generated read clock enable signal is applied to the received virtual clock signal CE2#1 to generate a virtual clock signal (denoted as CE2#1_2) for converting the ODU2#1 data frames to ODU1#1_1 data frames. The DSYNC $210_{B2}$ outputs the adapted ODU1 data frames (ODU1#1_2) and the virtual clock signal CE2#1_2 to the third desynchronizer stage (illustratively, to DSYNC $210_{C2}$).

The DSYNC $210_{C1}$ receives ODU1 data frames ODU1#1_1 and associated virtual clock signal CE2#1_1 from DSYNC $210_{B1}$. The DSYNC $210_{C1}$ converts the received ODU1 data frames to CBR2G5 data frames (denoted as CBR2G5#1_1 output from DSYNC $210_{C1}$). The DSYNC $210_{C1}$ converts the ODU1#1_1 data frames to CBR2G5#1_1 data frames using the virtual clock signal CE2#1_1 from DSYNC $210_{B1}$ as a write clock enable signal and a common read clock signal. The common read clock signal is applied to the received virtual clock signal CE2#1_1 for converting the ODU1#1_1 data frames to CBR2G5#1_1 data frames. The DSYNC $210_{C1}$ outputs the adapted CBR2G5 data frames (CBR2G5#1_1). In one embodiment, the CBR2G5#1_1 data frames are output to a switching module (not shown). As depicted in FIG. 2, in one embodiment in which DSYNC $210_{C1}$ is part of a final desynchronizer stage, the DSYNC $210_{C1}$ outputs a guidance signal operable for controlling an external analog phase-locked loop.

The DSYNC $210_{C2}$ receives ODU1 data frames ODU1#1_2 and associated virtual clock signal CE2#1_2 from DSYNC $210_{B2}$. The DSYNC $210_{C2}$ converts the received ODU1 data frames to CBR2G5 data frames (denoted as CBR2G5#1_2 output from DSYNC $210_{C2}$). The DSYNC $210_{C2}$ converts the ODU1#1_2 data frames to CBR2G5#1_2 data frames using the virtual clock signal CE2#1_2 from DSYNC $210_{B2}$ as a write clock enable signal and a common read clock signal. The common read clock signal is applied to the received virtual clock signal CE2#1_2 for converting the ODU1#1_2 data frames to CBR2G5#1_2 data frames. The DSYNC $210_{C2}$ outputs the adapted CBR2G5 data frames (CBR2G5#1_2). In one embodiment, the CBR2G5#1_2 data frames are output to a switching module (not shown). As depicted in FIG. 2, in one embodiment in which DSYNC $210_{C2}$ is part of a final desynchronizer stage, the DSYNC $210_{C2}$ outputs a guidance signal operable for controlling an external analog phase-locked loop.

As depicted in FIG. 2, an output port of DSYNC $210_{C1}$ is coupled to an input port of an analog PLL (APLL) $220_1$. The APLL $220_1$ receives guidance signals from a numerical controlled oscillator associated with DSYNC $210_{C1}$ and generates a read clock signal. The APLL $220_1$ sends the read clock signal to DSYNC $210_{C1}$ for converting the ODU1#1_1 data frames to CBR2G5#1_1 data frames. The APLL $220_1$ sends the read clock signal downstream for use by the downstream module that receives the CBR2G5#1_1 data frames output by DSYNC $210_{C1}$. An analog PLL (APLL) $220_2$ performs substantially similar functions for DSYNC $210_{C2}$ as APLL $220_1$ performs for DSYNC $210_{C2}$. In one embodiment, the APLL $220_1$ and APLL $220_2$ in the third desynchronizer stage operate as clean-up PLLs operable for suppressing high frequency jitter.

It should be noted that the embodiment depicted and described herein with respect to FIG. 2 comprises an embodiment in which multiple hierarchical signaling levels are adapted over multiple associated channels. Thus, although depicted and described with respect to a multi-level/multi-channel embodiment, the present invention may readily be applied to both single-level and multi-level embodiments, as well as single-channel and multi-channel embodiments, and various combinations thereof. As depicted and described with respect to FIG. 2, the present invention ensures that a maximum of one external analog PLL is required for each channel.

Thus, by eliminating the need for additional external analog PLLs at each desynchronizer stage, the present invention produces numerous advantages.

In particular, since only one clock domain is required internally for multi-channel applications, the present invention thereby reducing low frequency jitter and wander normally caused by crosstalk of external analog PLLs having small frequency differences. As such, by significantly reducing the number of external analog PLLs required for adapting data frames between differing signaling hierarchies, the present invention ensures that output jitter is less dependant on the behavior of analog PLLs, especially on the large tolerance of voltage controlled oscillators (e.g., surface acoustic waves) in terms of gain, analog parasitics, and the like. Moreover, reducing the number of external analog PLLs significantly increases the reliability of the associated circuit pack (thereby increasing overall system reliability), significantly reduces the cost of the print wiring board, and results in various other associated advantages, such as a reduction is required floor space, a reduction is power design problems, and the like.

In one embodiment, a desynchronizer as depicted and described herein with respect to FIG. 2 (illustratively, DSYNCs 210) performs at least a portion of the methodologies of the present invention. In one embodiment, a DSYNC converts data frames of a first hierarchy to data frames of a second hierarchy using virtual clock signals. In one such embodiment, the virtual clock signals are generated using a combination of the an input clock signal associated with the data frames of the first hierarchy and a clock enable signal generated by the DSYNC. In one embodiment, a DSYNC transmits the generated clock enable signal to another DSYNC for use in converting data frames between differing hierarchies. In another embodiment, a DSYNC transmits the virtual clock signal to another DSYNC for use in converting data frames between differing hierarchies. A DSYNC is depicted and described herein with respect to FIG. 3.

Figure 3:
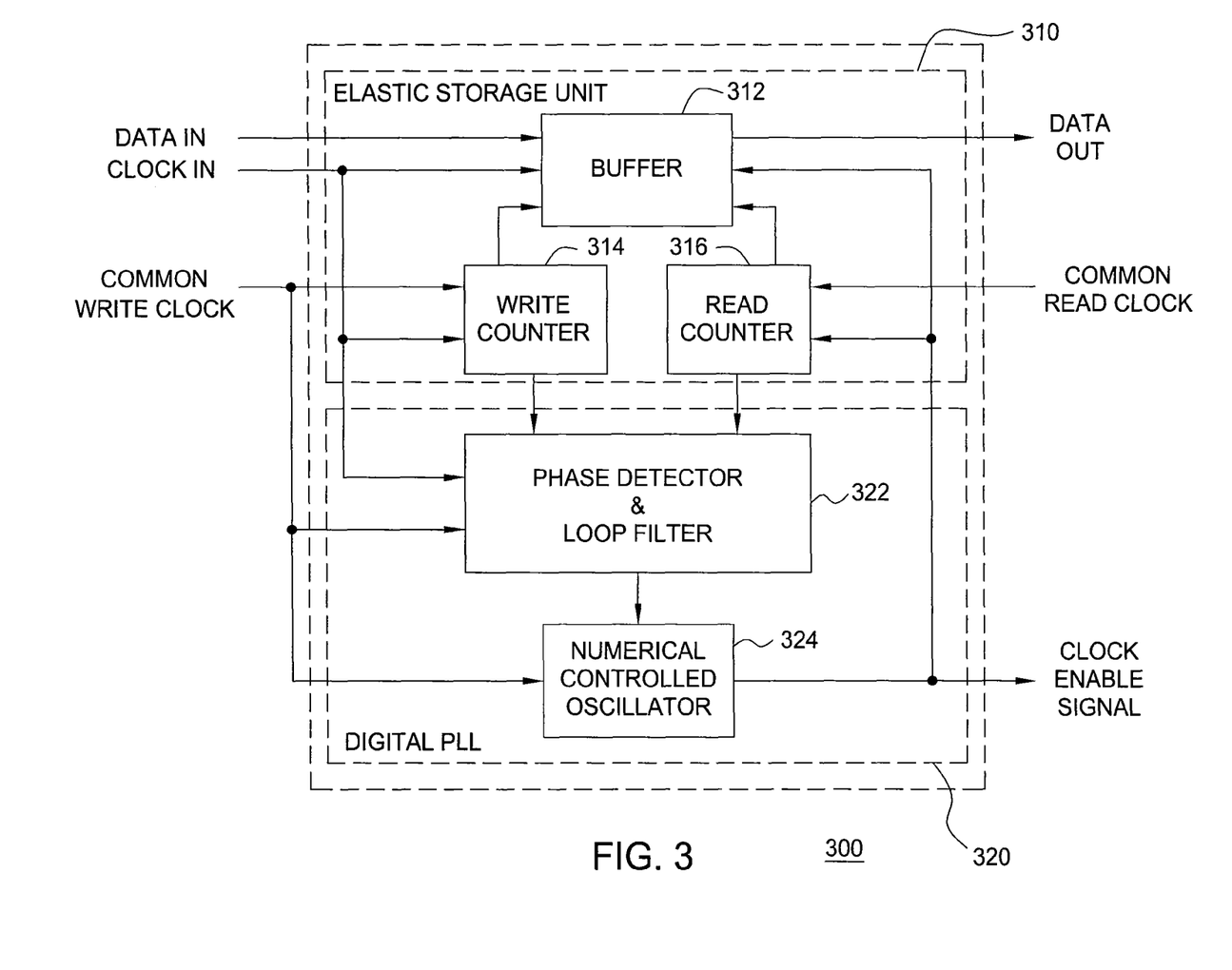
FIG. 3 depicts a high-level block diagram of a desynchronizer of FIG. 2.

FIG. 3 depicts a high-level block diagram of a desynchronizer of FIG. 2. Specifically, desynchronizer 300 of FIG. 3 comprises an elastic storage unit (ESU) 310 and a digital phase-locked loop (DPLL) 320. As depicted in FIG. 3, the ESU 310 includes a buffer 312, a write counter 314, and a read counter 316. The DPLL 320 includes a phase detector and loop filter (PDLP) 322 and a numerical controlled oscillator (NCO) 324. The buffer 312 receives a DATA IN signal comprising data frames of a first type (e.g., a first data rate, a first frame format, a first frame hierarchy, and the like), and transmits a DATA OUT signal comprising data frames of a second type (e.g., a second data rate, a second frame format, a second hierarchy, and the like).

In one embodiment, the DATA IN signal corresponds to received data frames of a first data rate and the DATA OUT signal corresponds to transmitted data frames of a second data rate, where the second data rate is different than the first data rate. In another embodiment, the DATA IN signal corresponds to received data frames of a first hierarchy and the DATA OUT signal corresponds to transmitted data frames of a second hierarchy, where the second hierarchy is different than the first hierarchy. In another embodiment, the DATA IN signal corresponds to received data frames of a first hierarchy and the DATA OUT signal corresponds to transmitted data frames of a second hierarchy, where the second hierarchy is different than the first hierarchy. Although described herein with respect to first and second data rates, frame formats, and hierarchies, in one embodiment, the present invention may be used for converting data frames differing with respect to various other parameters.

For example, for DSYNCs $210_A$ disposed in the first desynchronizer stage of FIG. 2, DATA IN corresponds to the received ODU3 data frames, and DATA OUT corresponds to the transmitted ODU2#1__1 and ODU2#1__2 data frames. Similarly, for example, for DSYNCs $210_B$ disposed in the second desynchronizer stage of FIG. 2, DATA IN corresponds to the received ODU2#1 data frames output from DSYNC $210_{A1}$ and DATA OUT corresponds to the transmitted ODU1#1__1 and ODU1#1__2 data frames. Similarly, for example, for DSYNCs $210_C$ disposed in the third desynchronizer stage of FIG. 2, DATA IN corresponds to the received ODU1#1__1 and ODU1#1__2 data frames output from DSYNC $210_{B1}$ and DSYNC $210_{B2}$, respectively, and DATA OUT corresponds to the transmitted CBR2G5#1__1 and CBR2G5#1__2 data frames.

As depicted in FIG. 3, buffer 312 receives a CLOCK IN signal. In one embodiment, the CLOCK IN signal operates as a write clock enable signal. In one embodiment, in a first stage desynchronizer, the CLOCK IN signal comprises a common clock signal associated with the data frames of the DATA IN signal. In another embodiment, in a first stage desynchronizer, a CLOCK IN signal is not received. In one such embodiment, a local write clock is used as the write clock enable signal. In one embodiment, in an intermediate stage desynchronizer or a final stage desynchronizer, the CLOCK IN signal comprises a virtual clock signal received from a desynchronizer in a previous stage. In another embodiment, in an intermediate stage desynchronizer or a final stage desynchronizer, the CLOCK IN signal comprises a read clock enable signal received from a desynchronizer in a previous stage.

For example, for DSYNCs $210_A$ disposed in the first desynchronizer stage of FIG. 2, CLOCK IN comprises the common clock signal associated with the received ODU3 data frames. Similarly, for example, for DSYNCs $210_B$ disposed in the second desynchronizer stage of FIG. 2, CLOCK IN comprises the virtual clock signal CE2#1 output from DSYNC $210_{A1}$. Similarly, for example, for DSYNCs $210_C$ disposed in the third desynchronizer stage of FIG. 2, CLOCK IN comprises virtual clock signals CE2#1__1 and CE2#1__2 output from DSYNC $210_{B1}$ and DSYNC $210_{B2}$, respectively. Although not depicted, in one embodiment, CLOCK IN comprises a read clock enable signal.

Thus, in one embodiment, the CLOCK IN signal comprises at least one of a common clock signal (e.g., a common data clock signal, a common write clock signal, a common read clock signal, and the like), a clock enable signal (e.g., a write clock enable signal, a read clock enable signal, and the like), or a virtual clock signal, as well as various combinations thereof. As such, various different combinations of clock signals may be used for converting data frames of a first type to data frames of a second type in accordance with the present invention.

As depicted in FIG. 3, buffer 312 comprises a DATA IN port for receiving data frames and a DATA OUT port for transmitting data frames. The buffer 312 comprises a CLOCK IN port for receiving the CLOCK IN signal. The buffer 312 writes (i.e., stores) data frames received at the DATA IN port. The writing of the received data frames is performed according to the CLOCK IN signal (i.e., a write clock enable signal). The buffer 312 reads (i.e., removes) data frames via the DATA OUT port according to read clock enable signals. In one embodiment, a virtual clock signal comprises a combination of a clock input signal received via the CLOCK IN port and the read clock enable signal generated by DPLL 320. As depicted in FIG. 3, the read clock enable signal is generated by DPLL 320 using various input signals.

As depicted in FIG. 3, write counter 314 is coupled to buffer 312 for monitoring writing of data frames (data frames associated with the DATA IN signal) into buffer 312. Therefore, write counter 314 maintains a count of the number of data frames written into buffer 312. In one embodiment, the write counter 314 is controlled by the input clock signal (i.e., the CLOCK IN signal) and a common write clock signal. The output port of write counter 314 is coupled to an input port of PDLF 322 for enabling PDLF 322 to monitor a relative fill level of buffer 312.

As depicted in FIG. 3, read counter 316 is coupled to buffer 312 for monitoring reading of data frames (data frames associated with the DATA OUT signal) out of buffer 312. Therefore, read counter 316 maintains a count of the number of data frames read out of buffer 312. In one embodiment, the read counter 316 is controlled by the clock enable signal (generated by NCO 324) and a common read clock signal. The output port of read counter 316 is coupled to an input port of PDLF 322 for enabling PDLF 322 to enabling PDLF 322 to monitor a relative fill level of buffer 312.

As depicted in FIG. 3, PDLF 322 receives the write count from write counter 314 and receives the read count from read counter 316. Using the write count and the read count, PDLF 322 monitors the relative fill level of buffer 312. In one embodiment, PDLF 322 uses the relative fill level of buffer 312 to generate a control signal used by NCO 324 for generating the read clock enable signal. In one embodiment, PDLF 322 receives the CLOCK IN signal and the common write clock signal. In one such embodiment, PDLF 322 uses the CLOCK IN signal and the common write clock signal to generate the control signal used by NCO 324 for generating the read clock enable signal. The generation of an output signal by PDLF 322 is depicted and described herein with respect to FIG. 4. The output port of PDLF 322 is coupled to an input port of NCO 324 for enabling NCO 324 to generate the read clock enable signals.

As depicted in FIG. 3, NCO 324 generates the clock enable signals used for generating virtual clock signals for use in adapting data frames of a first hierarchy (i.e., received at the DATA IN port) to data frames of a second hierarchy (i.e., transmitted at the DATA OUT port). The NCO generates the clock enable signals using (1) the common write clock signal input to write counter 314 and PDLF 322 and (2) the output signal generated by PDLF 322. The NCO 324 generates the clock enable signal by The generation of an output clock enable signal by NCO 324 is depicted and described herein with respect to FIG. 4. The output port of NCO 324 is coupled to an input port of read counter 316 and an input port of buffer 312. Furthermore, in one embodiment, the output port of NCO 324 is coupled to a CLOCK IN port of a downstream component (e.g., another DSYNC (not depicted)).

As such, NCO 324 generates a clock enable signal. The clock enable signal generated by the NCO 324 is used to define the frequency of the virtual clock signal for reads data frames from buffer 312 such that the removed data frames transmitted as the DATA OUT signal are different than the written data frames received as the DATA IN signal. As such, the clock enable signals are applied to the common clock signals (e.g., common read clock signal, common write clock signal, and the like) to produce virtual clock signals having differing frequencies. In one embodiment, a common clock comprises a normal real clock used to clock registers. The enable signal defines the frequency at which the normal real clock is used for clocking registers by enabling the register input not at all clock edges, but rather only for a defined ratio of clock edges.

As described herein, application of read clock enable signal produced by NCO 324 to buffer 312, in combination with application of the CLOCK IN signal to buffer 312, results in a virtual clock signal that reads data frames from buffer 312 such that the removed data frames transmitted as the DATA OUT signal are different than the written data frames received as the DATA IN signal. As described herein, in one embodiment, for example, the removed data frames leave buffer 312 according to a different hierarchy (e.g., ODU2 data frames) than the hierarchy with which the data frames entered the buffer 312 (e.g., ODU3 data frames). In other embodiment, the removed data frames transmitted as the DATA OUT signal differ from the written data frames received as the DATA IN signal with respect to data rate, data frame format, and various other parameters.

Although primarily described herein as being generated according to a relative buffer fill level, generation of a virtual clock signal in accordance with the present invention may be performed using various other parameters. In one embodiment, generation of a virtual clock signal is performed using at least one of a data rate ratio (e.g., the ratio of the data rate associated with the DATA IN signal and the data rate associated with the DATA OUT signal) or a clock rate ratio (e.g., the ratio of the clock rate associated with the CLOCK IN signal and the clock rate associated with the read clock enable signal generated by a DPLL), as well as various combinations thereof. In one embodiment, the clock rate ratio may be determined using various other pairs of clocks associated with a desynchronizer.

Although described herein as comprising specific clock input signals, the CLOCK IN signal may comprise various other clock signals. For example, in one embodiment (illustratively, in the first desynchronizer stage of FIG. 2), the input clock signal (i.e., CLOCK IN) comprises a common clock signal associated with the received data frames of the first hierarchy. Similarly, for example, in another embodiment (illustratively, in the second and third desynchronizer stages of FIG. 2), the input clock signal comprises a clock enable signal generated by an upstream desynchronizer. For example, the CLOCK IN signal associated with DSYNC $210_{B1}$ comprises the clock enable signal generated by DSYNC $210_{A1}$.

Figure 4:
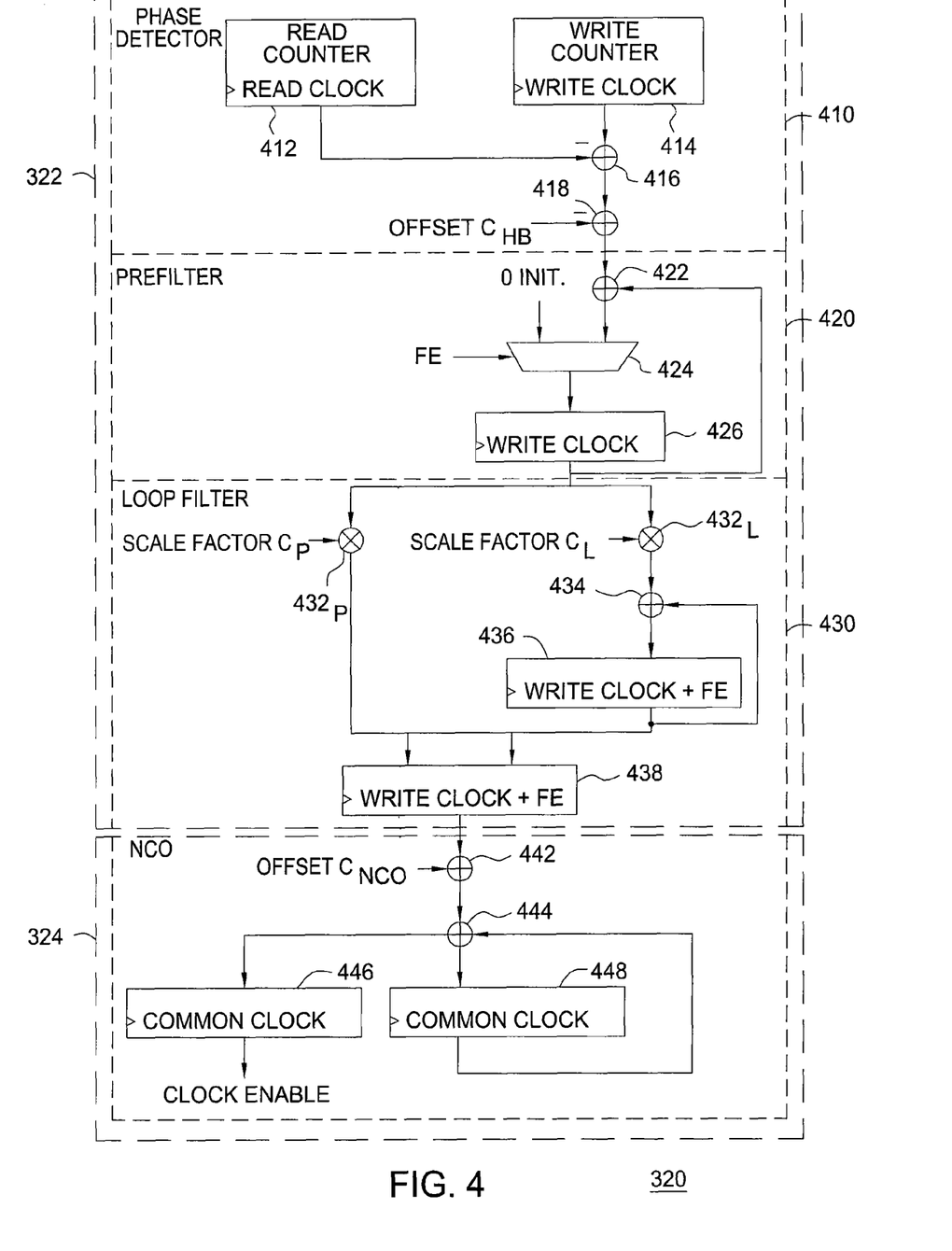
FIG. 4 depicts a high-level block diagram of the digital phase locked loop of the desynchronizer of FIG. 3.

FIG. 4 depicts a high-level block diagram of the digital phase locked loop of the desynchronizer of FIG. 3. Specifically, the DPLL 320 of FIG. 4 comprises PDLF 322 and NCO 324 as depicted and described herein with respect to FIG. 3. As depicted in FIG. 4, PDLF 322 comprises a phase detector 410, a pre-filter 420, and a loop filter 430. As depicted in FIG. 4, the output of loop filter 430 is coupled to the input of NCO 324. As described herein, NCO 324 generates the clock enable signal.

As depicted in FIG. 4, phase detector 410 comprises a read counter 412, a write counter 414, a first adder 416, and a second adder 418. The read counter 412 receives a read clock as an input clock signal. The write counter 414 receives a write clock as an input clock signal. In one embodiment, read counter 412 and write counter 414 are implemented as read counter 316 and write counter 316 of ESU 310, respectively. As depicted in FIG. 4, first adder 416 subtracts the output of read counter 412 from the output of write counter 414. The output of first adder 416 is provided as an input to adder 418. The second adder 418 subtracts an offset value (illustratively, Offset $C_{HB}$) from the output from first adder 416. The result generated by second adder 418 is output from phase detector 410 and provided as an input to pre-filter 420.

As depicted in FIG. 4, pre-filter 420 comprises an adder 422, a multiplexer 424, and a pre-filter module 426. The adder 422 receives the output from adder 418 of phase detector 410 as a first input. The adder 422 receives the output of pre-filter module 426 as a second input (the output of pre-filter module 426 is looped back as an input to adder 422). The adder 422 adds the first input (the output from adder 418) and the second input (the output from pre-filter module 426) and provides the result as an input to multiplexer 424. In one embodiment, multiplexer 424 is initialized using a "0" value. The multiplexer 424 is controlled by a filter enable (FE) signal. In one embodiment, the FE signal marks the end of a filter window. The output of multiplexer 424 is provided as input to pre-filter module 426. The pre-filter module 426 is controlled by a write clock signal. The output of the pre-filter module 426 is fed back as input to adder 422. The output of the pre-filter module 426 is provided as an input to loop filter 430.

As depicted in FIG. 4, loop filter 430 comprises a first multiplier $432_P$, a second multiplier $432_L$, an adder 434, a first filter module 436, and a second filter module 438. The first multiplier $432_P$ receives the output from pre-filter module 426 of pre-filter 420 as a first input. The first multiplier $432_P$ receives a scaling factor $C_P$ as a second input. The first multiplier $432_P$ multiplies the output from pre-filter module 426 and the scaling factor $C_P$ and sends the result of the multiplication operation as a first input to second filter module 438. The second multiplier $432_L$ receives the output from pre-filter module 426 of pre-filter 420 as a first input. The second multiplier $432_L$ receives a scaling factor $C_L$ as a second input. The second multiplier $432_L$ multiplies the output from pre-filter module 426 and the scaling factor $C_L$ and sends the result of the multiplication operation as a first input to adder 434.

The adder 434 receives the output from second multiplier $432_L$ as a first input. The adder 434 receives the output from first filter module 436 as a second input. The adder 434 adds the output from second multiplier $432_L$ and the output from first filter module 436 (the output of first filter module 436 is looped back as an input to adder 434). The output of adder 436 is provided as input to first filter module 436. The output of first filter module 436 is provided as input to adder 434. The output of first filter module 436 is provided as a second input to second filter module 438. The second filter module 438 receives the output of multiplier 432 and the output of first filter module 436. The second filter module 438 produces an output signal that is provided as an input to NCO 324. As depicted in FIG. 4, first filter module 436 and second filter module 438 are controlled by a combination of the write clock signal and the FE signal.

As depicted in FIG. 4, NCO 324 comprises a first adder 442, a second adder 444, a clock enable generator 446, and a clock enable feedback module 448. The first adder 442 receives the output from second filter module 438 of the PDLF 322. The first adder 442 adds an offset value (illustratively, Offset $C_{NCO}$) to the output from second filter module 438. The result output from first adder 442 is provided as an input to second adder 444. The second adder 444 receives the output from first adder 442 as a first input. The second adder 444 receives the output from clock enable feedback module 448 as a second input. The second adder 444 adds the output from first adder 442 and the output from clock enable feedback module 448. The result output from second adder 444 is provided as an input to clock enable generator 446 and clock enable feedback module 448. The clock enable generator 446 and clock enable feedback module 448 are both controlled by a common clock signal. The output from clock enable feedback module 448 is fed back as input to adder 444.

The output from clock enable generator 446 is the clock enable signal generated by NCO as depicted and described herein. In one embodiment, at least a portion of the offset values (illustratively, Offset $C_{HB}$ and Offset $C_{NCO}$) and the scale factors (illustratively, Scale Factor $C_P$ and Scale Factor $C_L$) comprise fixed value constants. In one embodiment, the read clock and write clock depicted and described with respect to FIG. 4 comprise common clocks plus a corresponding clock enable signal.

Figure 5:
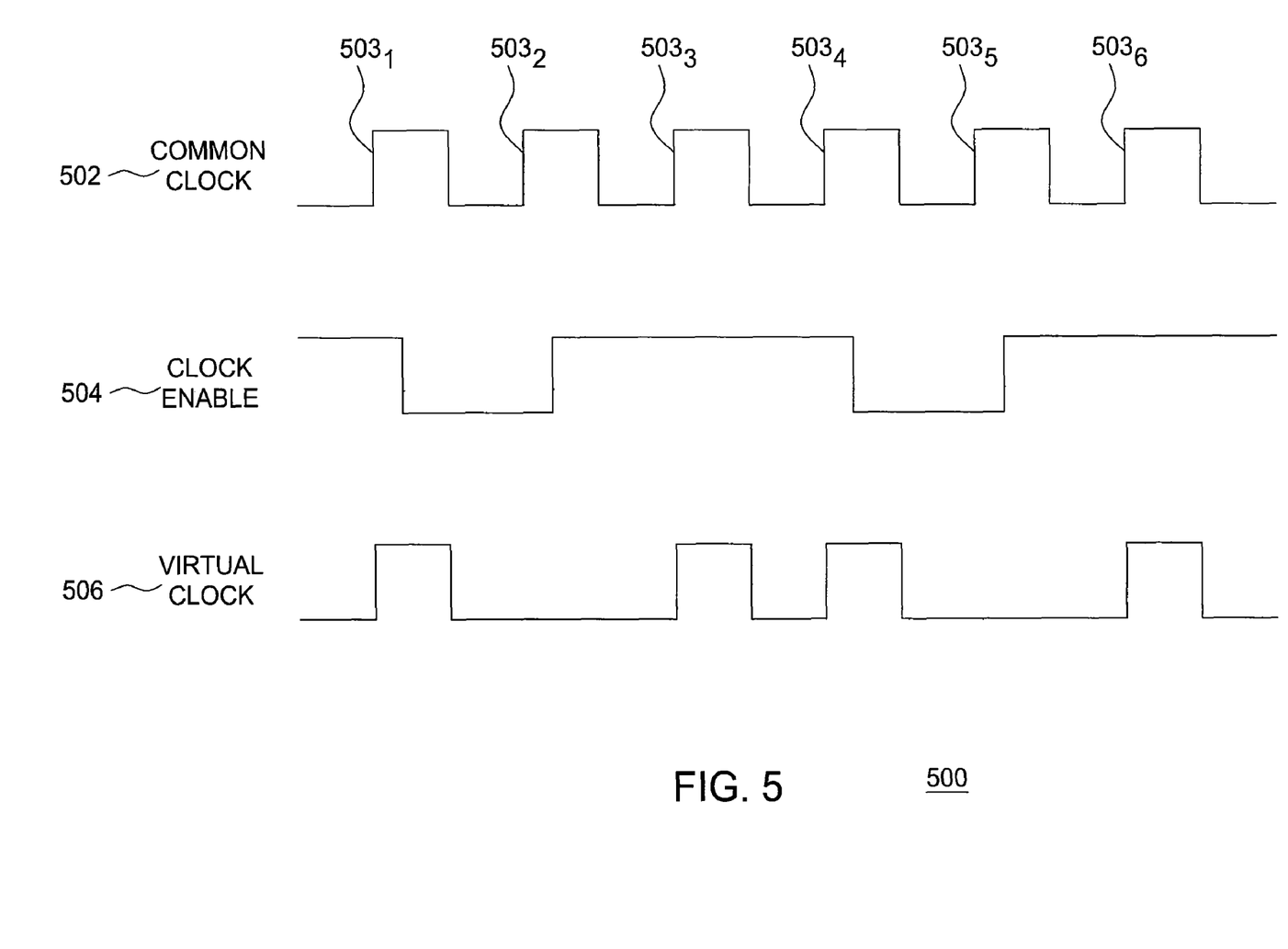
FIG. 5 depicts a virtual clock signal generated using a common clock signal associated with data frames input to the desynchronizer of FIG. 3 and a clock enable signal generated by the desynchronizer of FIG. 3.

FIG. 5 depicts a virtual clock signal generated using a common clock signal associated with data frames input to the desynchronizer of FIG. 3 and a clock enable signal generated by the desynchronizer of FIG. 3. Specifically, FIG. 5 depicts a common clock signal 502 including a plurality of leading edges $503_1$-$503_6$ (collectively, leading edges 503), a clock enable signal 504, and a virtual clock signal 506 resulting from the combination of common clock signal 502 and clock enable signal 504. As depicted in FIG. 5, the virtual clock signal 506 is triggered (i.e., is identical to the common clock signal 502) if the clock enable signal 504 is active high during the leading edge of that common clock signal 502.

In other words, as depicted in FIG. 5, since clock enable signal 504 is active high during leading edge $503_1$, virtual clock signal 506 is active high for the same duration as the pulse associated with leading edge $503_1$ of common clock signal 502. Similarly, since clock enable signal 504 is active high during leading edges $503_3$, $503_4$, and $503_6$, virtual clock signal 506 is active high for the same duration as the three pulses associated with leading edges $503_3$, $503_4$, and $503_6$ of common clock signal 502. Furthermore, since clock enable signal 504 is low during leading edges $503_2$ and $503_5$, virtual clock signal 506 remains low during the two pulses associated with leading edges $503_2$ and $503_5$ of common clock signal 502.

It is contemplated that at least a portion of the described functions may be combined into fewer functional elements. Similarly, it is contemplated that various functions may be performed by other functional elements, or that the various functions may be distributed across the various functional elements in a different manner. For example, at least a portion of the functions described herein as performed by the elastic storage unit may be performed by the digital phase-locked loop. Similarly, for example, at least a portion of the functions described herein as performed by the digital phase-locked loop may be performed by the elastic storage unit. Similarly, functions associated with the elastic storage unit and the digital phase-locked loop may be distributed across various other components (not depicted).

As described herein, the present invention supports conversion of data frames of a first hierarchy to data frames of a second hierarchy using a virtual clock signal. Although primarily described herein with respect to an optical network conveying data frames having data frame rates and data formats associated with OTN hierarchies (specifically, ODUk signaling levels where k=1,2,3 and the associated CBR2G5 signaling level), those skilled in the art will appreciate that the present invention may be used for converting higher-speed signals (e.g., ODUk, for k>3) between different hierarchies using virtual clock signals. Furthermore, those skilled in the art will appreciate that the present invention may be used for converting data frames between differing hierarchies using virtual clock signals in other networks conveying data frames according to other signaling hierarchies of data frame rates and associated data frame formats.

Figure 6:
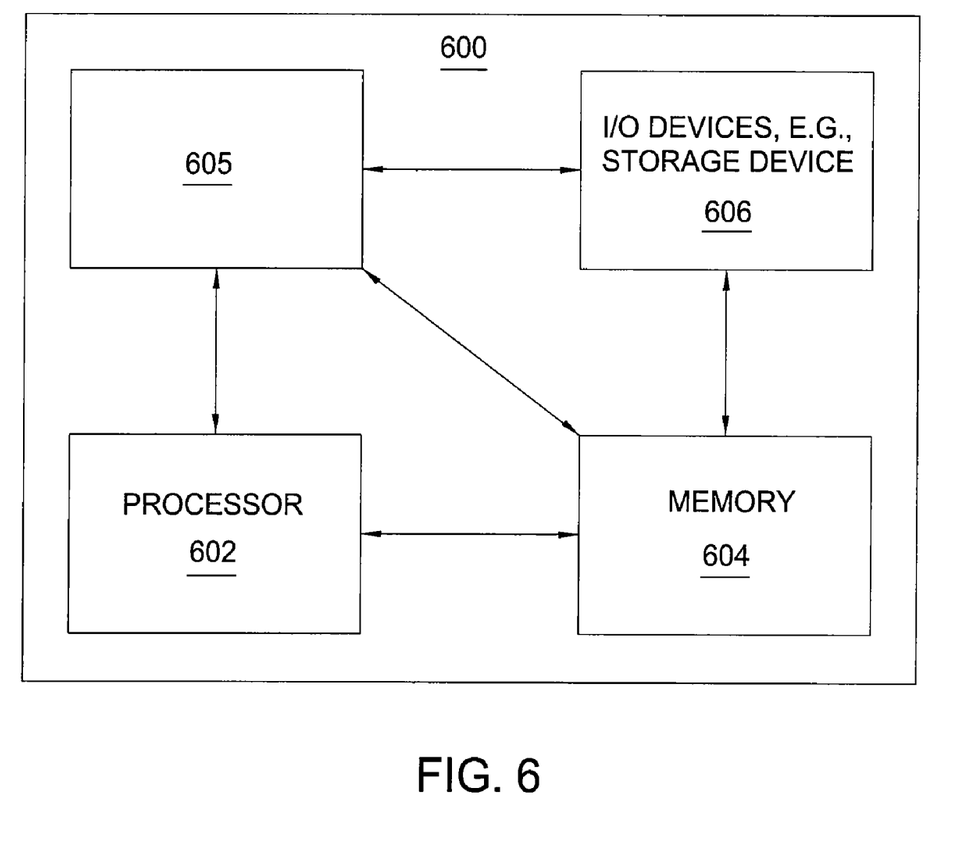
FIG. 6 general purpose computer suitable for use in performing the functions described herein.

FIG. 6 depicts a high level block diagram of a general purpose computer suitable for use in performing the functions described herein. As depicted in FIG. 6, system 600 comprises a processor element 602 (e.g., a CPU), a memory 604, e.g., random access memory (RAM) and/or read only memory (ROM), a desynchronizer module 605, and various input/output devices 606 (e.g., storage devices, including but not limited to, a tape drive, a hard disk drive or a compact disk drive, a receiver, a transmitter, an output port, and a user input device.

It should be noted that the present invention may be implemented in software and/or in a combination of software and hardware, e.g., using application specific integrated circuits (ASIC), a field programmable gate array (FPGA), a general purpose computer or any other hardware equivalents. In one embodiment, the present desynchronizer module or process 605 can be loaded into memory 604 and executed by processor 602 to implement the functions as discussed above. As such, the desynchronizer process 605 (including associated data structures) of the present invention can be stored on a computer readable medium or carrier, e.g., RAM memory, magnetic or optical drive or diskette and the like.

For example, in one embodiment, since the frequency for updates is the frame frequency (typically in the kHz range), the loop filter (e.g., a proportional-integral (PI) controller) may be implemented using an embedded processor (illustratively, processor 602). In another embodiment, depending upon the frequency range in which various other components/functions of the present invention are operating, various other components/functions of the present invention (e.g., NCO, phase detector, pre-filter, and the like) may be implemented using software, hardware, and various combinations thereof.

Although various embodiments which incorporate the teachings of the present invention have been shown and described in detail herein, those skilled in the art can readily devise many other varied embodiments that still incorporate these teachings.

What is claimed is:

1. A method for converting data frames from a first signal hierarchy to a second signal hierarchy using a buffer and a digital phase locked loop (PLL), comprising:
   receiving, at the buffer, data frames of the first signal hierarchy;
   receiving an input clock signal associated with the data frames of the first signal hierarchy;
   receiving a clock enable signal generated by the digital PLL using a relative fill level of the buffer; and
   converting the data frames of the first signal hierarchy to data frames of the second signal hierarchy using a virtual clock signal generated using a combination of the input clock signal and the clock enable signal; and
   transmitting, from the buffer, the data frames of the second signal hierarchy.

2. The method of claim 1, further comprising:
   determining the relative fill level of the buffer, wherein determining the relative fill level of the buffer comprises:
      monitoring a buffer write counter associated with the buffer for determining a write count indicative of a number of data frames entering the buffer; and
      monitoring a buffer read counter associated with the buffer for determining a read count indicative of a number of data frames leaving the buffer.

3. The method of claim 2, wherein the write count is received from a write counter associated with the buffer and the read count is received from a read counter associated with the buffer.

4. The method of claim 2, wherein the digital PLL comprises a detector-filter module, wherein the write count and the read count are monitored by the detector-filter module for determining the relative fill level of the buffer, wherein the detector-filter module generates a control signal using the determined relative fill level of the buffer.

5. The method of claim 4, wherein the digital PLL comprises a numerical controlled oscillator (NCO), wherein the NCO generates the clock enable signal using the control signal from the detector-filter module.

6. The method of claim 1, wherein the relative fill level of the buffer determined by a detector-filter module of the digital PLL and the clock enable signal is generated by a numerical controlled oscillator (NCO) of the digital PLL using the relative fill level of the buffer determined by the detector-filter module.

7. The method of claim 1, wherein the buffer and the digital PLL are formed on a common ASIC.

8. The method of claim 1, wherein each pulse of the virtual clock signal comprises a pulse from the input clock signal for which a leading edge of the pulse from the input clock signal is high when the clock enable signal is high.

9. The method of claim 1, further comprising:
   transmitting the data frames of the second signal hierarchy toward a desynchronizer; and
   transmitting the virtual clock signal toward the desynchronizer for use by the desynchronizer in generating another virtual clock signal for use in converting the data frames of the second signal hierarchy to data frames of a third signal hierarchy.

10. A method for converting data frames from a first signal hierarchy to a second signal hierarchy, comprising:
   performing, at a network element, the steps of:
      receiving data frames of the first signal hierarchy;
      receiving an input clock signal;
      receiving a clock enable signal; and
      converting the data frames of the first signal hierarchy to data frames of the second signal hierarchy using a virtual clock signal generated using a combination of the input clock signal and the clock enable signal;
      propagating the data frames of the second signal hierarchy.

11. The method of claim 10, wherein the clock enable signal is generated using at least one of:
   a clock rate ratio between a write clock signal and a read clock signal; and
   a data rate ratio between a first data rate associated with the data frames of the first signal hierarchy and a second data rate associated with the data frames of the second signal hierarchy.

12. The method of claim 10, wherein the clock enable signal is generated using a relative fill level associated with a buffer that receives the data frames of the first signal hierarchy and transmits the data frames of the second signal hierarchy.

13. The method of claim 12, further comprising:
   determining the relative fill level of the buffer, wherein determining the relative fill level of the buffer comprises:
      monitoring a buffer write counter associated with the buffer for determining a write count indicative of a number of data frames entering the buffer; and
      monitoring a buffer read counter associated with the buffer for determining a read count indicative of a number of data frames leaving the buffer.

14. The method of claim 12, wherein the clock enable signal is generated by a digital phase locked loop (PLL), wherein the relative fill level of the buffer is monitored using a detector-filter module of the digital PLL, wherein the clock enable signal is generated by a numerical controlled oscillator (NCO) of the digital PLL.

15. The method of claim 10, wherein the clock enable signal is received from a digital phase locked loop (PLL).

16. The method of claim 15, wherein the data frames are converted between the first and second signal hierarchies using a buffer, wherein the buffer and the digital PLL are formed on a common ASIC.

17. The method of claim 10, wherein each pulse of the virtual clock signal comprises a pulse from the input clock signal for which a leading edge of the pulse from the input clock signal is high when the clock enable signal is high.

18. The method of claim 10, further comprising:
transmitting the data frames of the second signal hierarchy toward a desynchronizer; and
transmitting the virtual clock signal towards the desynchronizer for use by the desynchronizer in generating another virtual clock signal for use in converting the data frames of the second signal hierarchy to data frames of a third signal hierarchy.

19. An apparatus for generating virtual clock signals for the differing signal hierarchies, comprising:
an elastic storage unit configured for receiving data frames of the first signal hierarchy, receiving an input clock signal, receiving a clock enable signal, and converting the data frames of the first signal hierarchy to data frames of the second signal hierarchy using a combination of the input clock signal and the clock enable signal as a virtual clock signal, wherein the elastic storage unit comprises a buffer configured for use in converting the data frames between the first and second signal hierarchies; and
a digital phase locked loop (PLL) for generating the clock enable signal for the elastic storage unit based on a relative fill level of the buffer of the elastic storage unit.

20. The apparatus of claim 19, wherein the digital PLL comprises:
a detector-filter module for determining the relative fill level of the buffer of the elastic storage unit and generating a control signal using the relative fill level of the buffer; and
a numerical controlled oscillator (NCO) for generating the clock enable signal using the control signal.

21. The apparatus of claim 19, wherein the elastic storage unit further comprises:
a write counter coupled to the buffer for determining a write count indicative of a number of data frames entering the buffer; and
a read counter coupled to the buffer for determining a read count indicative of a number of data frames leaving the buffer.

22. The apparatus of claim 21, wherein:
the write counter is controlled by the input clock signal and a common write clock signal; and
the read counter is controlled by the clock enable signal and a common read clock signal.

23. The apparatus of claim 22, wherein the digital PLL further comprises:
a detector-filter module coupled to the write counter and the read counter for monitoring the relative fill level of the buffer using the write count and the read count and generating a control signal using the relative fill level of the buffer.

24. The apparatus of claim 23, wherein the digital PLL further comprises:
a numerical controlled oscillator (NCO) coupled to the detector-filter module for receiving the control signal from the detector-filter module and generating the clock enable signal using the control signal.

25. An apparatus, comprising:
a first desynchronizer configured for operating without an associated analog phase locked loop and a second desynchronizer configured for operating with an associated analog phase locked loop;
wherein the first desynchronizer is configured for receiving data frames of a first signal hierarchy, receiving an input clock signal, generating a clock enable signal, converting the data frames from the first signal hierarchy to a second signal hierarchy using a combination of the input clock signal and the clock enable signal as a virtual clock signal, and propagating the data frames of the second signal hierarchy and the clock enable signal toward the second desynchronizer; and
wherein the second desynchronizer is configured for receiving the data frames of the second signal hierarchy and the clock enable signal from the first desynchronizer and converting the data frames from the second signal hierarchy to a third signal hierarchy using the received clock enable signal.

* * * * *